(12) United States Patent
Zhuang et al.

(10) Patent No.: US 9,936,403 B2
(45) Date of Patent: Apr. 3, 2018

(54) METHOD AND DEVICE FOR DETECTING TRAFFIC HOT SPOT OF CELL

(71) Applicant: Huawei Technologies Co., Ltd., Shenzhen (CN)

(72) Inventors: Hongcheng Zhuang, Shenzhen (CN); Youwen Yi, Shenzhen (CN); Zezhou Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 14/947,376

(22) Filed: Nov. 20, 2015

(65) Prior Publication Data

US 2016/0080952 A1 Mar. 17, 2016

Related U.S. Application Data

(63) Continuation of application No. PCT/CN2013/085545, filed on Oct. 21, 2013.

(30) Foreign Application Priority Data

May 23, 2013 (CN) .......................... 2013 1 0196537

(51) Int. Cl.
*H04W 24/04* (2009.01)
*H04L 12/24* (2006.01)
(Continued)

(52) U.S. Cl.
CPC ......... *H04W 24/04* (2013.01); *H04L 41/0213* (2013.01); *H04L 43/0817* (2013.01);
(Continued)

(58) Field of Classification Search
CPC ........... H04L 41/0213; H04L 43/0817; H04W 24/08; H04W 28/0231; H04W 24/04; H04W 88/08
See application file for complete search history.

(56) References Cited

U.S. PATENT DOCUMENTS

| 2010/0118702 A1 | 5/2010 | Wu et al. |
| 2013/0051332 A1* | 2/2013 | Sridhar ................. H04W 48/06 370/329 |

(Continued)

FOREIGN PATENT DOCUMENTS

| CN | 101128003 A | 2/2008 |
| CN | 101415207 A | 4/2009 |

(Continued)

OTHER PUBLICATIONS

Tang et al., "An On-line Hot-spot Detection Scheme in DS-CDMA Networks—Single Traffic Type," IEEE Communications Society, Globecom, Institute of Electrical and Electronics Engineers, New York, New York (2004).

(Continued)

*Primary Examiner* — Jae Y Lee
(74) *Attorney, Agent, or Firm* — Leydig, Voit & Mayer, Ltd.

(57) ABSTRACT

The embodiments of the present invention provide a method and a device for detecting a traffic hot spot of a cell. The method includes: acquiring load information of a cell in which a wireless access point AP is located, the load information includes at least two types of the following information: a data rate of user traffic requirement, the number of users associated with an AP, an average length of data packets and an average duration of successful transmissions; determining whether an operating state of the AP is abnormal according to the at least two types of information; determining a satisfaction degree of user according to the actual traffic rate of user, if the operating state of the AP is abnormal; and determining that a traffic hot spot exists in the cell, if the satisfaction degree of user is lower than a first preset threshold.

16 Claims, 3 Drawing Sheets

(51) Int. Cl.
*H04L 12/26* (2006.01)
*H04W 28/02* (2009.01)
*H04W 24/08* (2009.01)
*H04W 88/08* (2009.01)

(52) U.S. Cl.
CPC ....... *H04W 24/08* (2013.01); *H04W 28/0231* (2013.01); *H04W 88/08* (2013.01)

(56) References Cited

U.S. PATENT DOCUMENTS

| 2014/0112306 A1* | 4/2014 | Zhou | H04W 72/10 370/331 |
| 2015/0009826 A1* | 1/2015 | Ma | H04W 28/0268 370/235 |
| 2016/0094999 A1* | 3/2016 | Yu | H04W 16/14 455/454 |

FOREIGN PATENT DOCUMENTS

| CN | 101895934 A | 11/2010 |
| CN | 102210185 A | 10/2011 |
| CN | 102355736 A | 2/2012 |
| CN | 102726089 A | 10/2012 |
| CN | 103037439 A | 4/2013 |
| EP | 1489867 A1 | 12/2004 |
| WO | WO 2013043093 A1 | 3/2013 |
| WO | 2013066127 A1 | 5/2013 |

OTHER PUBLICATIONS

Dhananjay et al., "PigWin: Meaningful Load Estimation in IEEE 802.11 Based Wireless LANs," International Conference on Communications, Institute of Electrical and Electronics Engineers, New York, New York (2008).

* cited by examiner

METHOD AND DEVICE FOR DETECTING TRAFFIC HOT SPOT OF CELL

CROSS-REFERENCE TO RELATED APPLICATIONS

This application is a continuation of International Patent Application No. PCT/CN2013/085545, filed on Oct. 21, 2013, which claims priority to the Chinese Patent Application No. 201310196537.5, filed on May 23, 2013, both of which are hereby incorporated by reference in their entireties.

TECHNICAL FIELD

Embodiments of the present invention relate to the field of communication technologies and, in particular, to a method and a device for detecting a traffic hot spot of a cell.

BACKGROUND

With increasing requirement on user data rate, the role of a wireless local area network (Wireless Local Area Network, WLAN) has become more and more important. However, the WLAN has a relatively small coverage, the mobility of the user application is high, as a result, a WLAN network is even more dynamic, the number of wireless access points (Access Point, AP) to be maintained by a WLAN operator increases dramatically, and thus the maintenance cost needed is getting larger and larger. Particularly, a traffic hot spot of the WLAN network in a cell occurs increasingly frequently, and therefore, detection of a traffic hot spot in a cell has become a technical problem that has to be solved in the current WLAN network management.

In the prior art, a station records load conditions in each cell, including determining a traffic hot spot through determining the number of users accessing to an AP of the cell and through determining the number change of users accessing to the AP of the cell. If the number of users accessing to the AP of the cell is greater than a certain threshold and the number change of users accessing to the AP of the cell is greater than a certain threshold, then it is determined that a traffic hot spot exists in the cell.

In the prior art, however, when load is abnormally increased due to strong interference experienced by a cell, a traffic hot spot cannot be accurately determined by an AP and accordingly, it is easy to cause an error operation on a network.

SUMMARY

By using the method and the device for detecting a traffic hot spot of a cell provided in the present invention, the technical problem in the prior art is solved that when load is abnormally increased due to strong interference experienced by a cell, a traffic hot spot cannot be accurately determined by an access point and accordingly, it is easy to cause an error operation on a network.

In a first aspect, embodiments of the present invention provide a method for detecting a traffic hot spot of a cell, including:

acquiring load information of a cell in which a wireless access point AP is located, particularly, the load information includes at least two types of the following information: a data rate of user traffic requirement, the number of users associated with an AP, an average length of data packets and an average duration of successful transmissions;

determining whether an operating state of the AP is abnormal according to the at least two types of information;

determining a satisfaction degree of user according to an actual traffic rate of user, if the operating state of the AP is abnormal; and determining that a traffic hot spot exists in the cell, if the satisfaction degree of user is lower than a first preset threshold.

Combining the first aspect, in a first possible implementation of the first aspect, the acquiring the load information of the cell in which the wireless access point AP is located, includes:

acquiring samples of W sub-periods of data rate of user traffic requirement ($R_c[(n-1)W+1], \ldots, R_c[n]$) during a statistical period n, and determining a probability density distribution of the data rate of user traffic requirement according to the ($R_c[(n-1)W+1], \ldots, R_c[n]$);

acquiring samples of W sub-periods of the number of users associated with the AP ($U_c[(n-1)W+1], \ldots, U_c[n]$) during the statistical period n, and determining a probability density distribution of the number of users associated with the AP according to the ($U_c[(n-1)W+1], \ldots, U_c[n]$);

acquiring samples of W sub-periods of the average length of data packets ($PL_c[(n-1)W+1], \ldots, PL_c[n]$) during the statistical period n, and determining a probability density distribution of the average length of data packets according to the ($PL_c[(n-1)W+1], \ldots, PL_c[n]$);

acquiring samples of W sub-periods of the average duration of successful transmissions ($T_c[(n-1)W+1], \ldots, T_c[n]$) during the statistical period n, and determining a probability density distribution of the average successful transmissions duration according to the ($T_c[(n-1)W+1], \ldots, T_c[n]$).

Combining the first possible implementation of the first aspect, in a second possible implementation of the first aspect, the determining whether an operating state of the AP is abnormal according to the at least two types of information, includes:

determining whether an operating state of the cell is abnormal according to $$H_c = \begin{cases} 1, & \text{if } \alpha_1 h(\overline{R}_c(n), \varepsilon_r) + \alpha_2 h(\overline{U}_c(n), \varepsilon_u) + \alpha_3 h(\overline{PL}_c(n), \varepsilon_p) + \\ & \alpha_4 h(\overline{T}_c(n), \varepsilon_t) > 0 \\ 0, & \text{otherwise} \end{cases}$$

if $H_c=1$, then the operating state of the cell is abnormal; wherein, $\alpha_1, \alpha_2, \alpha_3, \alpha_4$ are weighted factors, $$\sum_{j=1}^{4} \alpha_j = 1,$$

and $h(\overline{R}_c(n), \varepsilon_r) = (\overline{R}_c(n) - E^r) - \sqrt{Var^r/\varepsilon_r}$, $\overline{R}_c(n)$ is an arithmetic mean value of ($R_c[(n-1)W+1], \ldots, R_c[n]$), $E^r$ is an expectation of $R_c[n]$ determined according to the probability density distribution of the data rate of user traffic requirement, $Var^r$ is a variance of $R_c[n]$ determined according to the probability density distribution of the data rate of user traffic requirement, $\varepsilon_r$ is an upper limit of a false alarm probability when detecting the change of the data rate of user traffic requirement;

$h(\overline{U}_c(n),\epsilon_u)=(\overline{U}_c(n)-E^u)-\sqrt{Var^u/\epsilon_u}$, $\overline{U}_c(n)$ is an arithmetic mean value of the $(U_c[(n-1)W+1], \ldots, U_c[n])$, $E^u$ is an expectation of $U_c[n]$ determined determined according to the probability density distribution of the number of users associated with the AP, $Var^u$ is a variance of $U_c[n]$ determined according to the probability density distribution of the number of users associated with the AP, $\epsilon_u$ is an upper limit of a false alarm probability when detecting the number change of users associated with the AP;

$h(\overline{PL}_c(n),\epsilon_{pl})=(\overline{PL}_c(n)-E^{pl})-\sqrt{Var^{pl}/\epsilon_{pl}}$, $\overline{PL}_c(n)$ is an arithmetic mean value of the $(PL_c[n-1)W+1], \ldots, PL_c[n])$, $E^{pl}$ is an expectation of $PL_c[n]$ determined according to the probability density distribution of the average length of data packets, $Var^{pl}$ is a variance of $PL_c[n]$ determined according to the probability density distribution of the average length of data packets, $\epsilon_{pl}$ is an upper limit of a false alarm probability when detecting the change of the average length of data packets;

$h(\overline{T}_c(n),\epsilon_t)=(\overline{T}_c(n)-E^t)-\sqrt{Var^t/\epsilon_t}$, $\overline{T}_c(n)$ is an arithmetic mean value of the $(T_c[(n-1)W+1], \ldots, T_c[n])$, $E^t$ is an expectation of $T_c[n]$ determined according to the probability density distribution of the average duration of successful transmissions, $Var^t$ is a variance of $T_c[n]$ determined according to the probability density distribution of the average duration of successful transmissions, $\epsilon_t$ is an upper limit of a false alarm probability when detecting the change of the average duration of successful transmissions.

Combining any one from the first aspect to the second possible implementation of the first aspect, in a third possible implementation of the first aspect, the determining the satisfaction degree of user according to the user data rate, includes:

determining the actual traffic rates of guaranteed bit rate (GBR) users and the average date rate of non-guaranteed bit rate (Non-GBR) users;

determining the actual traffic rates of GBR users and the average data rate of Non-GBR users; determining $S_{GBR,c}$ according to the actual traffic rates of the GBR users, and determining $S_{Non-GBR,c}$ according to the average data rate of the Non-GBR users; wherein, $$S_{GBR,c} = \frac{\sum \text{actual resulting rate of each } GBR \text{ user}}{\sum \text{guaranteed rate of each } GBR \text{ user}},$$

$$S_{Non-GBR,c} = \frac{\text{average rate of } Non\text{-}GBR \text{ user}}{AMBR \text{ mean value of } Non\text{-}GBR \text{ user}};$$

determining $S_c$ according to the $S_{GBR,c}$ and $S_{Non-GBR,c}$, wherein $S_c=k_1 \cdot S_{GBR,c}+(1-k_1)S_{Non-GBR,c}$, $S_c$ is the satisfaction degree of user.

Combining any one from the first aspect to the third possible implementation of the first aspect, in a fourth possible implementation of the first aspect, after determining that the traffic hot spot exists in the cell, the method further includes:

predicting a predicted satisfaction degree of user within a set future time period according the satisfaction degree of user;

determining that a traffic hot spot exists in the cell within the set future time period, if the predicted satisfaction degree of user is lower than a second preset threshold.

Combining the fourth possible implementation of the first aspect, in a fifth possible implementation of the first aspect, the predicting the predicted satisfaction degree of user within the set future time period according the satisfaction degree of user, includes:

predicting the predicted satisfaction degree of user within a set future time period according $$\begin{cases} L_n = \zeta \cdot (S_n - I_{n-d}) + (1-\zeta)L_{n-1} \\ I_n = \delta \cdot (S_n - L_n) + (1-\delta)I_{n-d} \\ \hat{S}_{n+h} = L_n + I_{n-d+h \bmod d} \end{cases},$$

where $\hat{S}_{n+h}$ is the predicted satisfaction degree of user, $S_n$ is the satisfaction degree of user, $L_n$ is a mean portion of the predicted satisfaction degree of user, $I_n$ is a periodic portion of the predicted satisfaction degree of user, d is the period that sequence $S_1, S_2, \ldots, S_n$ varies, $\zeta$ and $\delta$ are smoothing parameters for controlling the predicted satisfaction degree of user.

Combining the fourth possible implementation of the first aspect or the fifth possible implementation of the first aspect, in a sixth possible implementation of the first aspect, after determining that the traffic hot spot exists in the cell, the method further includes:

sending a traffic hot spot detection message to an access controller AC, so that the AC can determine a traffic hot spot area of a network according to the traffic hot spot detection message, where the traffic hot spot detection message carries a traffic hot spot (THS) parameter, and the THS is used for indicating that a traffic hot spot exists in the cell.

Combining the sixth possible implementation of the first aspect, in a seventh possible implementation of the first aspect, the traffic hot spot detection message further includes: an identity ID of the AP, the number of users associated with the AP, data rate of user traffic requirement, the average length of data packets, the average duration of successful transmissions, and the satisfaction degree of user or the predicted satisfaction degree of user.

Combining the sixth possible implementation of the first aspect or the seventh possible implementation of the first aspect, in a eighth possible implementation of the first aspect, the traffic hot spot detection message is sent based on a wireless access point protocol CAPWAP message or a simple network management protocol SNMP message.

In a second aspect, embodiments of the present invention provide a device for detecting a traffic hot spot of a cell, including:

an acquiring module, configured to acquire load information of a cell in which a wireless access point AP is located, the load information includes at least two types of the following information: the data rate of user traffic requirement, the number of users associated with an AP, the average length of data packets and the average duration of successful transmissions;

a determining module, configured to determine whether an operating state of the AP is abnormal according to the at least two types of information; determine a satisfaction degree of user according to the user data rate if the operating state of the AP is abnormal; and determine that a traffic hot spot exists in the cell if the satisfaction degree of user is lower than a first preset threshold.

Combining the first possible implementation of the second aspect, in a first possible implementation of the second aspect, the acquiring module includes:

a first acquiring unit, configured to acquire samples of W sub-periods of the data rate of user traffic requirement ($R_c[(n-1)W+1], \ldots, R_c[n]$) during a statistical period n, and determine a probability density distribution of the data rate of user traffic requirement according to the ($R_c[(n-1)W+1], \ldots, R_c[n]$);

a second acquiring unit, configured to acquire samples of W sub-periods of the number of users associated with the AP ($U_c[(n-1)W+1], \ldots, U_c[n]$) during the statistical period n, and determine a probability density distribution of the number of users associated with the AP according to the ($U_c[(n-1)W+1], \ldots, U_c[n]$);

a third acquiring unit, configured to acquire samples of W sub-periods of the average length of data packets ($PL_c[(n-1)W+1], \ldots, PL_c[n]$) during the statistical period n, and determining a probability density distribution of the average length of data packets according to the ($PL_c[(n-1)W+1], \ldots, PL_c[n]$);

a fourth acquiring unit, configured to acquire samples of W sub-periods of the average duration of successful transmissions ($T_c[(n-1)W+1], \ldots, T_c[n]$) during the statistical period n, and determine a probability density distribution of the average duration of successful transmissions according to the ($T_c[(n-1)W+1], \ldots, T_c[n]$).

Combining the first possible implementation of the second aspect, in a second possible implementation of the second aspect, the determining module is configured to determine whether an operating state of the cell is abnormal according to $$H_c = \begin{cases} 1, & \text{if } \alpha_1 h(\overline{R}_c(n), \varepsilon_r) + \alpha_2 h(\overline{U}_c(n), \varepsilon_u) + \alpha_3 h(\overline{PL}_c(n), \varepsilon_p) + \\ & \quad \alpha_4 h(\overline{T}_c(n), \varepsilon_t) > 0 \\ 0, & \text{otherwise} \end{cases}$$

if $H_c=1$, then the operating state of the cell is abnormal; wherein, $\alpha_1, \alpha_2, \alpha_3, \alpha_4$ are weighted factors, $$\sum_{j=1}^{4} \alpha_j = 1,$$

and $h(\overline{R}_c(n),\varepsilon_r)=(\overline{R}_c(n)-E^r)-\sqrt{Var^r/\varepsilon_r}$, $\overline{R}_c(n)$ is an arithmetic mean value of ($R_c[(n-1)W+1], \ldots, R_c[n]$), $E^r$ is an expectation of $R_c[n]$ determined according to the probability density distribution of the data rate of user traffic requirement, $Var^r$ is a variance of $R_c[n]$ determined according to the probability density distribution of the data rate of user traffic requirement, $\varepsilon_r$ is an upper limit of a false alarm probability when detecting the change of the data rate of user traffic requirement;

$h(\overline{U}_c(n),\varepsilon_u)=(\overline{U}_c(n)-E^u)-\sqrt{Var^u/\varepsilon_u}$, $\overline{U}_c(n)$ is an arithmetic mean value of the ($U_c[(n-1)W+1], \ldots, U_c[n]$), $E^u$ is an expectation of $U_c[n]$ determined determined according to the probability density distribution of the number of users associated with the AP, $Var^u$ is a variance of $U_c[n]$ determined according to the probability density distribution of the number of users associated with the AP, $\varepsilon_u$ is an upper limit of a false alarm probability when detecting the number change of users associated with the AP;

$h(\overline{PL}_c(n),\varepsilon_{pl})=(\overline{PL}_c(n)-E^{pl})-\sqrt{Var^{pl}/\varepsilon_{pl}}$, $\overline{PL}_c(n)$ is an arithmetic mean value of the ($PL_c[(n-1)W+1], \ldots, PL_c[n]$), $E^{pl}$ is an expectation of $PL_c[n]$ determined according to the probability density distribution of the average length of data packets, $Var^{pl}$ is a variance of $PL_c[n]$ determined according to the probability density distribution of the average length of data packets, $\varepsilon_{pl}$ is an upper limit of a false alarm probability when detecting the change of the average length of data packets;

$h(\overline{T}_c(n),\varepsilon_t)=(\overline{T}_c(n)-E^t)-\sqrt{Var^t/\varepsilon_t}$, $\overline{T}_c(n)$ is an arithmetic mean value of the ($T_c[(n-1)W+1], \ldots, T_c[n]$), $E^t$ is an expectation of $T_c[n]$ determined according to the probability density distribution of the average duration of successful transmissions, $Var^t$ is a variance of $T_c[n]$ determined according to the probability density distribution of the average duration of successful transmissions, $\varepsilon_t$ is an upper limit of a false alarm probability when detecting the change of the average duration of successful transmissions.

Combining any one from the second aspect to the second possible implementation of the second aspect, in a third possible implementation of the second aspect, the determining module is specifically configured to determine actual traffic rates of a GBR users and the average rate of Non-GBR users; determine $S_{GBR,c}$ according to the actual traffic rates of the GBR users, and determine $S_{Non-GBR,c}$ according to the average rate of Non-GBR users; where, $$S_{GBR,c} = \frac{\sum \text{actual resulting rate of each } GBR \text{ user}}{\sum \text{guaranteed rate of each } GBR \text{ user}},$$

$$S_{Non-GBR,c} = \frac{\text{average rate of } Non\text{-}GBR \text{ user}}{AMBR \text{ mean value of } Non\text{-}GBR \text{ user}};$$

determine $S_c$ according to the $S_{GBR,c}$ and $S_{Non-GBR,c}$, where $S_c=k_1 \cdot S_{GBR,c}+(1-k_1)S_{Non-GBR,c}$, $S_c$ is the satisfaction degree of user.

Combining any one from the second aspect to the third possible implementation of the second aspect, in a fourth possible implementation of the second aspect, the device further includes:

a predicting module, configured to predict a predicted satisfaction degree of user within a set future time period according the satisfaction degree of user;

the determining module is further configured to determine that a traffic hot spot exists in the cell within the set future time period, if the predicted satisfaction degree of user is lower than a second preset threshold.

Combining the fourth possible implementation of the second aspect, in a fifth possible implementation of the second aspect, the predicting module is configured to predict the predicted satisfaction degree of user within a set future time period according $$\begin{cases} L_n = \zeta \cdot (S_n - I_{n-d}) + (1-\zeta)L_{n-1} \\ I_n = \delta \cdot (S_n - L_n) + (1-\delta)I_{n-d} \\ \hat{S}_{n+h} = L_n + I_{n-d+h \bmod d} \end{cases},$$

where $\hat{S}_{n+h}$ is the predicted satisfaction degree of user, $S_n$ is the satisfaction degree of user, $L_n$ is a mean portion of the predicted satisfaction degree of user, $I_n$ is a periodic portion of the predicted satisfaction degree of user, d is the period that sequence $S_1, S_2, \ldots, S_n$ varies, $\zeta$ and $\delta$ are smoothing parameters for controlling the predicted satisfaction degree of user.

Combining the fourth possible implementation of the second aspect or the fifth possible implementation of the second aspect, in a sixth possible implementation of the second aspect, the device further includes:

a sending module, configured to send a traffic hot spot detection message to an access controller AC, so that the AC can determine a traffic hot spot area of a network according to the traffic hot spot detection message, where the traffic hot spot detection message carries a traffic hot spot (THS) parameter, and the THS is used for indicating that a traffic hot spot exists in the cell.

Combining the sixth possible implementation of the second aspect, in a seventh possible implementation of the second aspect, the traffic hot spot detection message further includes: an identity ID of the AP, the number of users associated with the AP, the data rate of user traffic requirement, the average length of data packets, the average duration of successful transmissions, and the satisfaction degree of user or the predicted satisfaction degree of user.

Combining the sixth possible implementation of the second aspect or the seventh possible implementation of the second aspect, in an eighth possible implementation of the second aspect, the traffic hot spot detection message is sent based on a wireless access point protocol CAPWAP message or a simple network management protocol SNMP message.

In the method for detecting a traffic hot spot of a cell provided in the embodiments of the present invention, acquiring, by the AP, load information of the cell, determining whether an operating state of the AP is abnormal according to the load information, detecting the determined satisfaction degree of user if the operating state of the AP is abnormal, and judging whether a traffic hot spot exists in the cell according to the detecting result, which can effectively identify the cell having a traffic hot spot and improve accuracy of the traffic hot spot detection.

BRIEF DESCRIPTION OF DRAWINGS

In order to illustrate embodiments of the present invention or the technical solution in the prior art more clearly, accompanying drawings needed for describing the embodiments or the prior art will be introduced in brief hereinafter. Apparently, the accompanying drawings show certain embodiments of the invention, and persons skilled in the art can derive other drawings from them without creative efforts.

DESCRIPTION OF EMBODIMENTS

In order to make the objects, technical solutions, and advantages of the embodiments of the present invention clearer, the technical solutions in the embodiments of the present invention are hereinafter described clearly and completely with reference to the accompanying drawings in the embodiments of the present invention. Obviously, the embodiments described here are part of the embodiments of the present invention but not all of the embodiments. All other embodiments obtained by persons skilled in the art on the basis of the embodiments of the present invention without any creative efforts all fall within the scope of the invention.

The techniques described herein can be used for various wireless communication systems such as the current 2G and 3G communication systems and the next generation communication system, such as a global system for mobile communication (GSM, Global System for Mobile communications), a code division multiple access (CDMA, Code Division Multiple Access) system, a time division multiple access (TDMA, Time Division Multiple Access) system, a wideband code division multiple access (WCDMA, Wideband Code Division Multiple Access Wireless), a frequency division multiple addressing (FDMA, Frequency Division Multiple Addressing) system, an orthogonal frequency-division multiple access (OFDMA, Orthogonal Frequency-Division Multiple Access) system, a single carrier FDMA (SC-FDMA) system, a general packet radio service (GPRS, General Packet Radio Service) system, a long term evolution (LTE, Long Term Evolution) system, a wireless local area network (Wireless Local Area Networks and other communication systems, WLAN), and other communication systems of this type.

The terminal involved in this application, that is, a user equipment, can be a wired terminal or a wireless terminal, the wireless terminal may refer to a device providing voice and/or data connectivity to a user, a handheld device having wireless connection function, or other processing devices connected to a wireless modem. The wireless terminal can communicate with one or more core networks via a wireless access network (such as, RAN, Radio Access Network), the wireless terminal can be a mobile terminal, such as a mobile phone (or called "cellular" phone) and a computer with a mobile terminal, and thus can be, for example, portable, pocket, hand-held, computer built-in, or vehicle-mounted mobile devices which communicate voice and/or data with a wireless access network. For example, a personal communication service (PCS, Personal Communication Service) phone, a wireless phone, a session initiation protocol (SIP) phone, a wireless local loop (WLL, Wireless Local Loop) station, a personal digital assistant (PDA, Personal Digital Assistant) and other devices. The wireless terminal also can be referred to as a system, a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (such as, access point) involved in this application can be referred to as a device in an access network that communicates, through one or more sectors, with wireless terminals over the air-interface. The base station can act as a router between the wireless terminal and the rest of the access network and is configured to convert received air-interface frames to IP packets, the rest of the access network can include an Internet Protocol (IP) network. The base station also coordinates management of attributes for the air interface. For example, the base station can be an AP in a WLAN, a base transceiver station (BTS, Base Transceiver Station) in GSM or CDMA, or a base station (NodeB) in WCDMA, or an evolved Node B (NodeB or eNB or e-NodeB, evolutional Node B) in LTE, and the present invention is not limited thereto.

Figure 1:
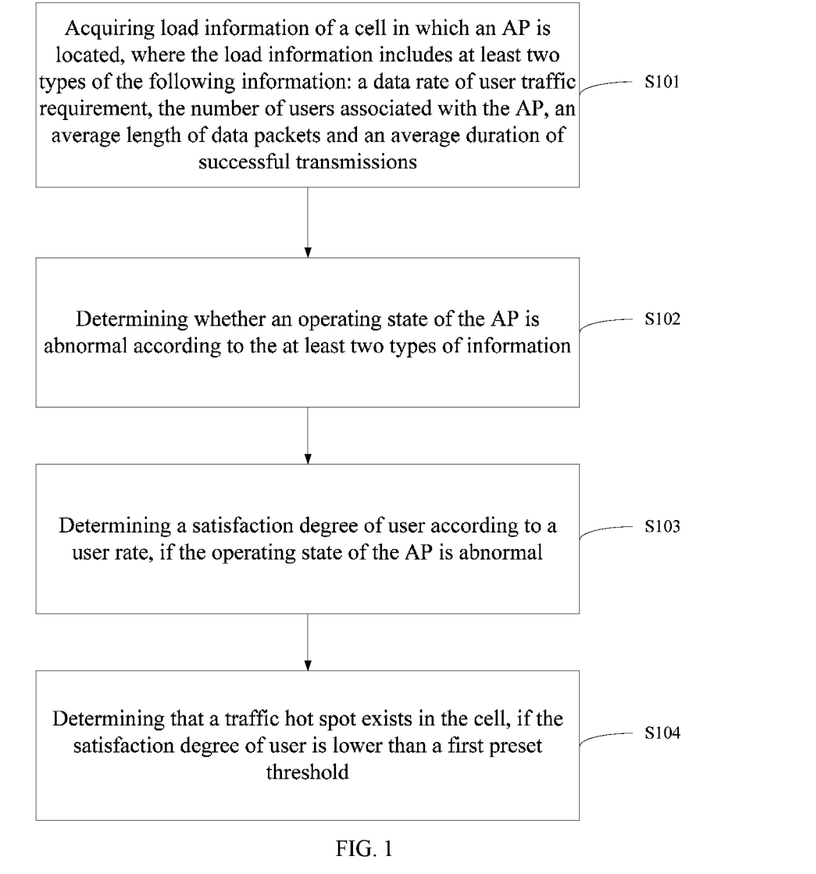
FIG. 1 is a schematic flowchart of a method for detecting a traffic hot spot of a cell according to Embodiment 1 of the present invention.

FIG. 1 is a schematic flowchart of a method for detecting a traffic hot spot of a cell according to Embodiment 1 of the present invention, the entity for executing the method involved in the embodiments of the present invention can be an AP, and the user mentioned in the embodiments can be a terminal accessing to the AP, as shown in FIG. 1, the method includes:

S101: Acquiring load information of a cell in which an AP is located, where the load information includes at least two types of the following information: a data rate of user traffic requirement, the number of users associated with the AP, an average length of data packets and an average duration of successful transmissions.

Particularly, in terms of detecting the traffic hot spot of the cell, the AP needs to acquire load information of the cell in which the AP is located during a statistical period, the load information includes a combination of more than two types of the following information: a data rate of traffic requirement of each user accessing to the AP, the number of users associated with the AP, an average length of data packets and an average duration of successful transmissions; the average length of data packets is a length of a data packet transmitted during communication between the user and the AP, the average duration of successful transmissions is a time length used for successfully transmitting the packet between the user and the AP; and the load information can be derived from a normal reporting of the user or a reporting of the user requested by the AP.

S102, Determining whether an operating state of the AP is abnormal according to the at least two types of information.

S103, Determining a satisfaction degree of user according to a user rate, if the operating state of the AP is abnormal.

S104, Determining that a traffic hot spot exists in the cell, if the satisfaction degree of user is lower than a first preset threshold.

Particularly, after acquiring the load information, the AP determines whether the operating state of the AP is abnormal according to the load information, specifically, determines a determinant function corresponding to each load information according to the load information, and takes a weighted average of the determinant functions, if the weighted average result is larger than 0, then a traffic hot spot may exist in the cell, otherwise, a traffic hot spot doesn't exist in the cell.

After determining that a traffic hot spot may exist in the cell, the AP determines the satisfaction degree of user, that is, the AP makes statistics of an actual resulting rate of a guaranteed bit rate (Guaranteed Bit Rate, GBR) user and an average rate of a non-guaranteed bit rate (Non Guaranteed Bit Rate, Non-GBR) user during a statistical period, determines the satisfaction degree of user according to the two types of rates, and defines four types of traffics in the 802.11e Protocol: voice (Voice), video (Video), best effort (Best Effort), background (Background), of which the former two types can be classified into GBR traffic while the latter two types can be classified into Non-GBR traffic. After determining the satisfaction degree of user, judges the determined satisfaction degree of user, if the satisfaction degree of user is lower than a first preset threshold, then determines that a traffic hot spot exists in the cell.

In the method for detecting a traffic hot spot of a cell provided in the embodiment of the present invention, acquiring, by the AP, load information of the cell, determining whether an operating state of the AP is abnormal according to the load information, detecting the determined satisfaction degree of user under the condition that the operating state of the AP is abnormal, and judging whether a traffic hot spot exists in the cell according to the detecting result, which can effectively identify the cell having a traffic hot spot and improve accuracy of the traffic hot spot detection.

On the basis of the embodiment shown in FIG. 1, the acquiring the load information of the cell in which the wireless access point AP is located, includes: acquiring samples of W sub-periods of the data rate of user traffic requirement ($R_c[(n-1)W+1], \ldots, R_c[n]$) during a statistical period n, and determining a probability density distribution of the data rate of user traffic requirement according to the ($R_c[(n-1)W+1], \ldots, R_c[n]$); acquiring samples of W sub-periods of the number of users associated with the AP ($U_c[(n-1)W+1], \ldots, U_c[n]$) during the statistical period n, and determining a probability density distribution of the number of users associated with the AP according to the ($U_c[(n-1)W+1], \ldots, U_c[n]$); acquiring samples of W sub-periods of the average length of data packets ($PL_c[(n-1)W+1], \ldots, PL_c[n]$) during the statistical period n, and determining a probability density distribution of the average length of data packets according to the ($PL_c[(n-1)W+1], \ldots, PL_c[n]$); acquiring samples of W sub-periods of the average duration of successful transmissions ($T_c[(n-1)W+1], \ldots, T_c[n]$) during the statistical period n, and determining a probability density distribution of the average duration of successful transmissions according to the ($T_c[(n-1)W+1], \ldots, T_c[n]$).

Particularly, the AP takes samples of load information of each user accessing to the AP during a statistical period n, and these sample values can be derived from a normal reporting of the user or a reporting of the user requested by the AP, and the n here refers to the n-th statistical period. The AP divides the statistical period n into W sub-periods and respectively takes samples of a data rate of user traffic requirement Rc, the number Uc of users associated with the AP, an average length of data packets PLc and an average duration of successful transmissions Tc to obtain W samples, particularly: acquires samples of the data rate of user traffic requirement in W sub-periods ($R_c[(n-1)W+1], \ldots, R_c[n]$) during the statistical period n, and divides the values of these samples into $2^N$ intervals according to sizes of these sample values, where the range below the minimum sample value and the range above the maximum sample value are defined an interval, respectively, the range between the minimum sample value and above the maximum sample value is divided into $2^N-2$ intervals with equal length, calculates the number of samples falling into each interval, normalizes sample numbers in each interval using the total sample numbers W, then obtains a histogram of the data rate of user traffic requirement as follows, i.e., the probability density distribution: $h_c^r(n)=(h_{c,1}^r(n), \ldots, h_{c,2^N}^r(n))$, where, $$\sum_{i=1}^{2^N} h_{c,i}^r(n) = 1;$$

similarly, based on the same operations, respectively obtains samples of the number of users associated with the AP in W sub-periods ($U_c[(n-1)W+1], \ldots, U_c[n]$), samples of the average length of data packets in W sub-periods ($PL_c[(n-1)W+1], \ldots, PL_c[n]$), and samples of the average duration of successful transmissions in W sub-periods ($T_c[(n-1)W+1], \ldots, T_c[n]$), and based on these samples, obtains corresponding histograms: $h_c^u(n)=(h_{c,1}^u(n), \ldots, h_{c,2^N}^u(n))$, $h_c^{pl}(n)=(h_{c,1}^{pl}(n), \ldots, h_{c,2^N}^{pl}(n))$ and $h_c^t(n)=(h_{c,1}^t(n), \ldots, h_{c,2^N}^t(n))$.

On the basis of the embodiment shown in FIG. 1, S101 specifically is: determining whether an operating state of the cell is abnormal according to $$H_c = \begin{cases} 1, & \text{if } \alpha_1 h(\overline{R}_c(n), \varepsilon_r) + \alpha_2 h(\overline{U}_c(n), \varepsilon_u) + \alpha_3 h(\overline{PL}_c(n), \varepsilon_p) + \\ & \alpha_4 h(\overline{T}_c(n), \varepsilon_t) > 0 \\ 0, & \text{otherwise} \end{cases}$$

if $H_c=1$, then the operating state of the cell is abnormal; wherein, $\alpha_1, \alpha_2, \alpha_3, \alpha_4$ are weighted factors, $$\sum_{j=1}^{4} \alpha_j = 1,$$

and $h(\overline{R}_c(n), \varepsilon_r) = (\overline{R}_c(n) - E^r) - \sqrt{Var^r/\varepsilon_r}$, $\overline{R}_c(n)$ is an arithmetic mean value of ($R_c[(n-1)W+1], \ldots, R_c[n]$), $E^r$ is an expectation of $R_c[n]$ determined according to the probability density distribution of the data rate of user traffic requirement, $Var^r$ is a variance of $R_c[n]$ determined according to the probability density distribution of the data rate of user traffic requirement, $\varepsilon_r$ is an upper limit of false alarm probability when detecting the change of the data rate of user traffic requirement; $h(\overline{U}_c(n), \varepsilon_u) = (\overline{U}_c(n) - E^u) - \sqrt{Var^u/\varepsilon_u}$, $\overline{U}_c(n)$ is an arithmetic mean value of the ($U_c[(n-1)W+1], \ldots, U_c[n]$), $E^u$ is an expectation of $U_c[n]$ determined according to the probability density distribution of the number of users associated with the AP, $Var^u$ is a variance of $U_c[n]$ determined according to the probability density distribution of the number of users associated with the AP, $\varepsilon_u$ is an upper limit of false alarm probability when detecting the number change of users associated with the AP; $h(\overline{PL}_c(n), \varepsilon_{pl}) = (\overline{PL}_c(n) - E^{pl}) - \sqrt{Var^{pl}/\varepsilon_{pl}}$, $\overline{PL}_c(n)$ is an arithmetic mean value of the ($PL_c[(n-1)W+1], \ldots, PL_c[n]$), $E^{pl}$ is an expectation of $PL_c[n]$ determined according to the probability density distribution of the average length of data packets, $Var^{pl}$ is a variance of $PL_c[n]$ determined according to the probability density distribution of the average length of data packets, $\varepsilon_{pl}$ is an upper limit of false alarm probability when detecting the change of the average length of data packets; $h(\overline{T}_c(n), \varepsilon_t) = (\overline{T}_c(n) - E^t) - \sqrt{Var^t/\varepsilon_t}$, $\overline{T}_c(n)$ is an arithmetic mean value of the ($T_c[(n-1)W+1], \ldots, T_c[n]$), $E^t$ is an expectation of $T_c[n]$ determined according to the probability density distribution of the average duration of successful transmissions, $Var^t$ is a variance of $T_c[n]$ determined according to the probability density distribution of the average duration of successful transmissions, $\varepsilon_t$ is an upper limit of false alarm probability when detecting the change of the average duration of successful transmissions.

Specifically, the AP determines the determinant function of the load information, according to sample values of the acquired load information and the probability density distribution corresponding to the sample values. It should be noted that, the load information here is also a combination of any of the two types of load information: Rc, Uc, PLc and Tc, and all the embodiments of the present invention are described provided that a combination of the four types of load information Rc, Uc, PLc and Tc is acquired by the AP.

Determine a determinant function of the data rate of user traffic requirement, $h(\overline{R}_c(n), \varepsilon_r) = (\overline{R}_c(n) - E^r) - \sqrt{Var^r/\varepsilon_r}$, according to sample values of the data rate of user traffic requirement and corresponding histograms, where, $R_c(n)$ is an arithmetic mean value of ($R_c[(n-1)W+1], \ldots, R_c[n]$), $E^r$ is an expectation of $R_c[n]$ determined according to the probability density distribution of the data rate of user traffic requirement, i.e., $$E^r = \sum_{i=1}^{2^N} h_{c,i}^r R_{c,i},$$

$Var^r$ is a variance of $R_c[n]$ determined according to the probability density distribution of the data rate of user traffic requirement, i.e., $$Var^r = \sum_{i=1}^{2^N} (R_{c,i} - E^r)^2 h_{c,i}^r, \varepsilon_r$$

is an upper limit of false alarm probability when detecting the change of the data rate of user traffic requirement, i.e., based on a Chebyshev bound, $\Pr\{h(\overline{R}_c(n), \varepsilon_r) > 0 | h_c^r(n)\} \leq \varepsilon_r$, in the embodiments of the present invention, $\varepsilon_r = 0.05$; more particularly, $$H_1 = \begin{cases} 1, & \text{if } h(\overline{R}_c(n), \varepsilon_r) > 0 \\ 0, & \text{otherwise} \end{cases}$$

can be used for detecting the data rate of user traffic requirement change, if $H_1=1$, then it represents that the data rate of traffic requirement increases.

Similarly, in a determinant function of the number of users associated with the AP, $h(\overline{U}_c(n), \varepsilon_u) = (\overline{U}_c(n) - E^u) - \sqrt{Var^u/\varepsilon_u}$, $$E^u = \sum_{i=1}^{2^N} h_{c,i}^u U_{c,i},$$

$$Var^u = \sum_{i=1}^{2^N} (U_{c,i} - E^u)^2 h_{c,i}^u,$$

$\varepsilon_u$ is an upper limit of detected false alarm probability, taking a value of 0.05, where, $\Pr\{h(\overline{U}_c(n), \varepsilon_u) > 0 | h_c^u(n)\} \leq \varepsilon_u$; and $$H_2 = \begin{cases} 1, & \text{if } h(\overline{U}_c(n), \varepsilon_u) > 0 \\ 0, & \text{otherwise} \end{cases},$$

if $H_2=1$, then it represents that the number of users associated with the AP increases.

Similarly, in a determinant function of the average length of data packets, $h(\overline{PL}_c(n), \varepsilon_{pl}) = (\overline{PL}_c(n) - E^{pl}) - \sqrt{Var^{pl}/\varepsilon_{pl}}$, $$E^{pl} = \sum_{i=1}^{2^N} h_{c,i}^{pl} PL_{c,i},$$

$$Var^{pl} = \sum_{i=1}^{2^N} (PL_{c,i} - E^{pl})^2 h_{c,i}^{pl},$$

$\epsilon_{pl}$ is an upper limit of detected false alarm probability, taking a value of 0.05, $$H_3 = \begin{cases} 1, & \text{if } h(\overline{PL_c}(n), \varepsilon_{pl}) > 0 \\ 0, & \text{otherwise} \end{cases},$$

if $H_3=1$, then it represents that the average length of data packets increases.

Similarly, in a determinant function of the average duration of successful transmissions, $h(\overline{T}_c(n), \epsilon_t) = (\overline{T}_c(n) - E^t) - \sqrt{Var^t/\epsilon_t}$, $$E^t = \sum_{i=1}^{2^N} h_{c,i}^t T_{c,i},$$

$$Var^t = \sum_{i=1}^{2^N} (T_{c,i} - E^t)^2 h_{c,i}^t,$$

$\epsilon_t$ is an upper limit of detected false alarm probability, taking a value of 0.05, $$H_4 = \begin{cases} 1, & \text{if } h(\overline{T}_c(n), \varepsilon_t) > 0 \\ 0, & \text{otherwise} \end{cases},$$

if $H_4=1$, then it represents that the average duration of successful transmissions increases.

After determining the above four determinant functions, the AP determines whether an operating state of the cell is abnormal according to the function $$H_c = \begin{cases} 1, & \text{if } \alpha_1 h(\overline{R}_c(n), \varepsilon_r) + \alpha_2 h(\overline{U}_c(n), \varepsilon_u) + \\ & \alpha_3 h(\overline{PL}_c(n), \varepsilon_p) + \alpha_4 h(\overline{T}_c(n), \varepsilon_t) > 0 \\ 0, & \text{otherwise} \end{cases};$$

that is, judges whether a traffic hot spot exists in the cell based on a joint detection of a data rate of user traffic requirement, the number of users associated with an AP, an average length of data packets and an average duration of successful transmissions of the cell covered by the AP; if $H_c=1$, then the operating state of the cell is abnormal and a traffic hot spot may exist in the cell, otherwise, the operating state of the cell is normal and a traffic hot spot doesn't exist in the cell; where, $\alpha_1, \alpha_2, \alpha_3, \alpha_4$ are weighted factors, $$\sum_{j=1}^{4} \alpha_j = 1,$$

$\alpha_1, \alpha_2, \alpha_3, \alpha_4$ are set as 0.25 respectively.

Further, S103 includes: determining an actual traffic rate of a guaranteed bit rate GBR and an average rate of a non-guaranteed bit rate Non-GBR; determining $S_{GBR,c}$ according to the actual traffic rate of the GBR user, and determining $S_{Non-GBR,c}$ according to the average rate of a non-guaranteed bit rate Non-GBR user; where, $$S_{GBR,c} = \frac{\sum \text{actual resulting rate of each } GBR \text{ user}}{\sum \text{guaranteed rate of each } GBR \text{ user}},$$

$$S_{Non-GBR,c} = \frac{\text{average rate of Non-}GBR \text{ user}}{AMBR \text{ mean value of Non-}GBR \text{ user}};$$

determining $S_c$ according to the $S_{GBR,c}$ and $S_{Non-GBR,c}$, where $S_c = k_1 \cdot S_{GBR,c} + (1-k_1) S_{Non-GBR,c}$, $S_c$ is the satisfaction degree of user.

After judging that a traffic hot spot may exist in the cell, further judges whether a traffic hot spot exists in the cell, that is, judges a satisfaction degree of user, prior to the judgment, determines the satisfaction degree of user according to a user rate, that is, determines Sc according to rates of a GBR user and a Non-GBR user, and judges whether the satisfaction degree of user is lower than a preset threshold according to the formula $$THS_c = \begin{cases} 1, & \text{if } H_c = 1 \text{ and } S_c < S_{thr} \\ 0, & \text{otherwise} \end{cases},$$

where Hc is a weighted average result from a joint detection executed by the AP, $S_{thr}$ is a first preset threshold, if $THS_c=1$, then it represents that the operating state of the AP is abnormal, i.e., the operating state of the cell is abnormal, then determines that a traffic hot spot exists in the cell.

In the method for detecting a traffic hot spot of a cell provided in the embodiment of the present invention, acquiring, by the AP, load information of the cell, determining whether an operating state of the AP is abnormal according to the load information, detecting the determined satisfaction degree of user under the condition that the operating state of the AP is abnormal, and judging whether a traffic hot spot exists in the cell according to the detecting result, which can effectively identify the cell having a traffic hot spot and improve accuracy of the traffic hot spot detection; meanwhile, the user doesn't need to report a contention window during transmission in each time, thereby reducing an air interface overhead of the AP.

Figure 2:
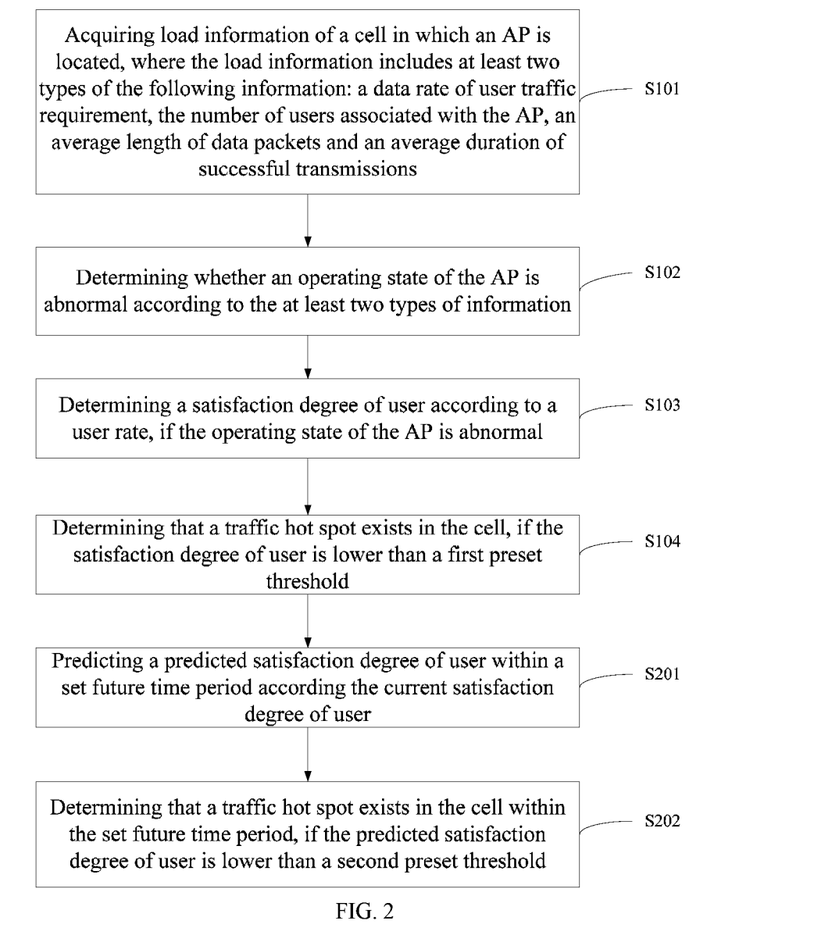
FIG. 2 is a schematic flowchart of a method for detecting a traffic hot spot of a cell according to Embodiment 2 of the present invention.

FIG. 2 is a schematic flowchart of a method for detecting a traffic hot spot of a cell according to Embodiment 2 of the present invention, the entity for executing the method involved in the embodiments of the present invention can be an AP, and the user mentioned in the embodiments can be a terminal accessing to the AP, as shown in FIG. 2, on the basis of the embodiment shown in FIG. 1, after S104, the method further includes an implementing method for judging a traffic hot spot in a cell within a future time, including the steps as follows:

S201, Predicting a predicted satisfaction degree of user within a set future time period according the current satisfaction degree of user.

Particularly, in order to further determine whether a traffic hot spot exists in a cell where the AP is located within a future time period, there is a need to predict the satisfaction degree of user; makes statistics of satisfaction degree of user $S_1, S_2, \ldots, S_n$ within N statistical periods, and $S_1, S_2, \ldots, S_n$ can be represented as a sequence with a period of d, that is, values of $S_1, S_2, \ldots, S_n$ are varied with the period of d, predicts a value $\hat{S}_{n+h}$ after h periods of the sequence, according to the current recorded $S_1, S_2, \ldots, S_n$, and the $\hat{S}_{n+h}$ is the predicted satisfaction degree of user, that is, predicting the predicted satisfaction degree of user within a set future time period according to $$\begin{cases} L_n = \zeta \cdot (S_n - I_{n-d}) + (1-\zeta)L_{n-1} \\ I_n = \delta \cdot (S_n - L_n) + (1-\delta)I_{n-d} \\ \hat{S}_{n+h} = L_n + I_{n-d+h \bmod d} \end{cases},$$

where $\hat{S}_{n+h}$ is the predicted satisfaction degree of user, $S_n$ is the satisfaction degree of user, $L_n$ is a mean portion of the predicted satisfaction degree of user, $I_n$ is a periodic portion of the predicted satisfaction degree of user, d is the period that sequence $S_1, S_2, \ldots, S_n$ varies, $\zeta$ and $\delta$ are smoothing parameters for controlling the predicted satisfaction degree of user; the period d can be obtained by correlating the sequence, if d can be obtained, then the predicted satisfaction degree of user can be obtained, that is, $S_1, S_2, \ldots, S_n$ is a periodic sequence, if d cannot be obtained, then $S_1, S_2, \ldots, S_n$ is not a periodic sequence, and the predicted result $\hat{S}_{n+h}=0$.

S202, Determining that a traffic hot spot exists in the cell within the set future time period, if the predicted satisfaction degree of user is lower than a second preset threshold.

Particularly, after the predicted satisfaction degree of user is predicted, judges according to formula $S_c^a = k_2 S_c^p + (1-k_2) S_c$, where, $S_c^a$ is a weighted average value of the predicted satisfaction degree of user, $S_c^p$ is the predicted satisfaction degree of user, which is equivalent to $\hat{S}_{n+h}$ here, if $S_c^p=0$, then $k_2=0$, otherwise $k_2=0.5$; hereinafter, judges whether the predicted satisfaction degree of user is lower than a second preset threshold according to formula $$THS_c = \begin{cases} 1, & \text{if } H_c = 1 \text{ and } S_c^a < S_{c,thr}^a \\ 0, & \text{otherwise} \end{cases},$$

where, $S_{c,thr}^a$ is the second preset threshold, if $THS_c=1$, then the operating state of the cell is abnormal, and the predicted satisfaction degree of user is lower than the second preset threshold $S_{c,thr}^a$, then determines that a traffic hot spot exists in the cell within a set future time period.

In the method for detecting a traffic hot spot of a cell provided in the embodiments of the present invention, after judging, by the AP, a traffic hot spot exists in the current cell, further determining a predicted satisfaction degree of user, and judging whether a traffic hot spot exists in the cell within a set future time period according to the predicted satisfaction degree of user, which can effectively identify the cell having a traffic hot spot, acquire traffic hot spot information of the cell within a set future time period, and further improve accuracy of the traffic hot spot detection; mean-while, the user doesn't need to report a contention window during transmission in each time, thereby reducing an air interface overhead of the AP.

On the basis of the above embodiments, after determining that a traffic hot spot exists in the cell, the embodiments of the present invention further provide an implementation scenario that the AP sends a traffic hot spot detection message to an access controller (Access Controller, AC) so that the AC can determine a traffic hot spot area in the network according to the traffic hot spot detection message. The traffic hot spot detection message can carry a traffic hot spot (Traffic Hot Spot, THS), and the THS is used for indicating that a traffic hot spot exists in the cell; the traffic hot spot detection message further includes: an identity (Identity, ID) of the AP, the number of users associated with the AP, the data rate of user traffic requirement, the average length of data packets, the average duration of successful transmissions, and the satisfaction degree of user or the predicted satisfaction degree of user; the traffic hot spot detection message is sent based on a wireless access point protocol message (Control And Provisioning of Wireless Access Points Protocol Specification, CAPWAP) or a simple network management protocol (Simple Network Management Protocol, SNMP) message.

Particularly, the AC is a control point which manages the AP to achieve multi-user access, after determining that a traffic hot spot exists in the cell, the AP sends a traffic hot spot detection message to the AC (here, it can be the case that after determining that a traffic hot spot exists in the cell, multiple APs report respective traffic hot spot detection message to the AC, that is, the AC collects the traffic hot spot detection message reported by each AP), the traffic hot spot detection message carries a THS, the AC judges a traffic hot spot area in the WLAN network, according to position and coverage range information of each AP, as well as the THS reported by each AP, that is, adjacent cells having traffic hot spots can be classified into one hot spot area, if multiple cells having traffic hot spots are far from each other, then the AC will divide the multiple cells having traffic hot spots into multiple traffic hot spot areas, i.e., divide the hot spot APs into different groups according to different THS eliminating strategies taken in next step, and thus select appropriate network optimization operations for different traffic hot spot areas.

Further, the traffic hot spot detection message, which is reported by the AP to the AC, also includes: an ID of the AP, the number of users associated with the AP, a data rate of user traffic requirement, an average length of data packets, an average duration of successful transmissions, and a satisfaction degree of user or a predicted satisfaction degree of user, that is, the traffic hot spot detection message reported by the AP to the AC is performed in a format shown in Table 1.

TABLE 1

| AP_ID | User_num | Rate_req | Pkt_len_avg | Pkt_tm_avg | User_sat | THS |
|---|---|---|---|---|---|---|

Particularly, AP_ID is the ID of the AP, configured to identify the AP which reports a message; User_num is the number of users associated with the AP; Rate_req is the data rate of traffic requirement; Pkt_len_avg is average length of data packets; Pkt_tm_avg is the average duration of successful transmissions; User_sat is the satisfaction degree of user or the predicted satisfaction degree of user; THS is the identification bit of a 1 bit traffic hot spot, if the detecting result is the traffic hot spot, then the bit is 1, otherwise is 0. These contents can be packed together and interacted in a format shown in Table 1 via the message between the AP and the AC, such as a CAPWAP protocol message and an SNMP protocol message; or can be transmitted item by item in a type length value (Type-Length-Value, TLV) format, for example, THS can be represented in a format shown in Table 2:

TABLE 2

| Type | Length (bit) | Value |
|------|--------------|-------|
| THS  | 1            | 1     |

If it is based on the CAPWAP protocol, the AP can report contents to the AC based on CAPWAP protocol (RFC 5415), the data can be sent through an option section of wireless specific information (Wireless Specific Information) in CAPWAP header, that is, the number of users associated with the AP, the data rate of user traffic requirement, the average length of data packets, the average duration of successful transmissions, the satisfaction degree of user and the THS identity within the statistical period are put in the wireless specific information; or can be sent through a wireless payload (Wireless Payload) section of the data packet; if it is based on the SNMP protocol, the AP and the AC also can transmit information through a protocol data unit (Protocol Data Unit, PDU) of the SNMP protocol, the AC retrieves data shown in Table 1 through GET, GET-NEXT and GETBULK protocol instructions, or the AP actively transmits data to the AC using TRAP or INFORM (SNMP vl does not support), in a case without being queried.

In the method for detecting a traffic hot spot of a cell provided in the embodiments of the present invention, acquiring, by the AP, load information of the cell, determining whether an operating state of the AP is abnormal according to the load information, detecting the determined satisfaction degree of user if the operating state of the AP is abnormal, and judging whether a traffic hot spot exists in the cell according to the detecting result, which can effectively identify the cell having a traffic hot spot and improve accuracy of the traffic hot spot detection; meanwhile, the user doesn't need to report a contention window during transmission in each time, thereby reducing an air interface overhead of the AP.

Persons skilled in the art may appreciate that, all or partial steps of the above method embodiments can be implemented in a program instruction related hardware. The program can be stored in a computer readable medium. When the program is executed, the steps in the above method embodiments are performed; the storage medium includes various media capable of storing program codes, such as a read only memory (ROM), a random access memory (RAM), a floppy disk, or an optical disk and the like.

Figure 3:
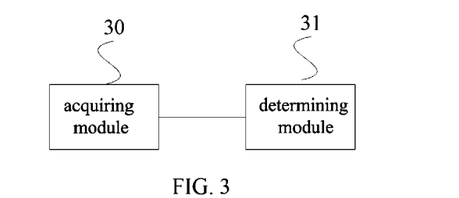
FIG. 3 is a schematic structural diagram of a device for detecting a traffic hot spot of a cell according to Embodiment 1 of the present invention.

FIG. 3 is a schematic structural diagram of a device for detecting a traffic hot spot of a cell according to Embodiment 1 of the present invention, as shown in FIG. 3, the device includes: an acquiring module 30, configured to acquire load information of a cell in which a wireless access point AP is located, where the load information includes at least two types of the following information: a data rate of user traffic requirement, the number of users associated with an AP, an average length of data packets and an average duration of successful transmissions; a determining module 31, configured to determine whether an operating state of the AP is abnormal according to the at least two types of information; determine a satisfaction degree of user according to a user rate if the operating state of the AP is abnormal; and determine that a traffic hot spot exists in the cell if the satisfaction degree of user is lower than a first preset threshold.

The device for detecting a traffic hot spot of a cell in this embodiment can perform of the method for detecting a traffic hot spot of a cell shown in Embodiment 1, they have similar implementation principle and technical effect, and thus the details will not be described here again.

Figure 4:
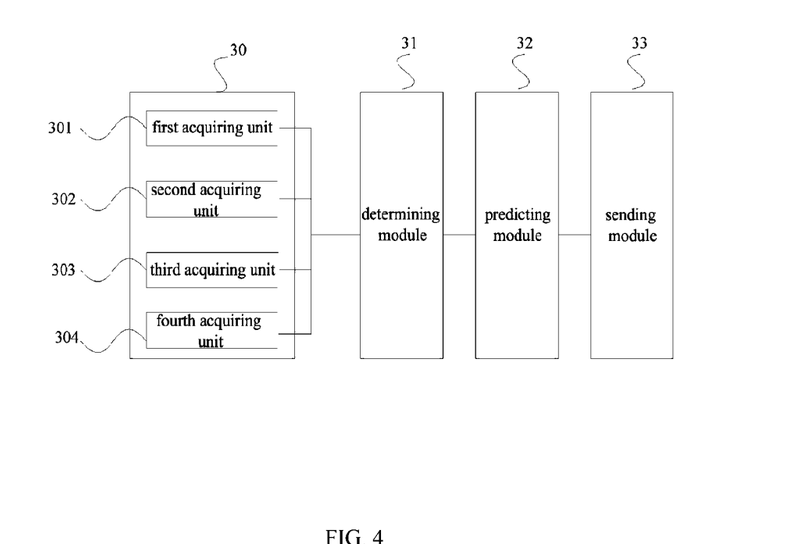
FIG. 4 is a schematic structural diagram of a device for detecting a traffic hot spot of a cell according to Embodiment 2 of the present invention.

FIG. 4 is a schematic structural diagram of a device for detecting a traffic hot spot of a cell according to Embodiment 2 of the present invention, on the basis of the embodiment shown in FIG. 3, the acquiring module 30 includes: a first acquiring unit 301, configured to acquire samples of W sub-periods of the data rate of user traffic requirement ($R_c[(n-1)W+1], \ldots, R_c[n]$) during a statistical period n, and determine a probability density distribution of the data rate of user traffic requirement according to the ($R_c[(n-1)W+1], \ldots, R_c[n]$); a second acquiring unit 302, configured to acquire samples of W sub-periods of the number of users associated with the AP ($U_c[(n-1)W+1], \ldots, U_c[n]$) during the statistical period n, and determine a probability density distribution of the number of users associated with the AP according to the ($U_c[(n-1)W+1], \ldots, U_c[n]$); a third acquiring unit 303, configured to acquire samples of W sub-periods of the average length of data packets ($PL_c[(n-1)W+1], \ldots, PL_c[n]$) during the statistical period n, and determine a probability density distribution of the average length of data packets according to the ($PL_c[(n-1)W+1], \ldots, PL_c[n]$); a fourth acquiring unit 304, configured to acquire samples of W sub-periods of the average duration of successful transmissions ($T_c[(n-1)W+1], \ldots, T_c[n]$) during the statistical period n, and determine a probability density distribution of the average duration of successful transmissions according to the ($T_c[(n-1)W+1], \ldots, T_c[n]$).

The device for detecting a traffic hot spot of a cell in this embodiment can perform the method for detecting a traffic hot spot of a cell shown in above embodiments, they have similar implementation principle and technical effect, and thus the details will not be described herein again.

With continued reference to FIG. 4, the determining module 31 is configured to determine whether an operating state of the cell is abnormal according to $$H_c = \begin{cases} 1, & \text{if } \alpha_1 h(\overline{R}_c(n), \varepsilon_r) + \alpha_2 h(\overline{U}_c(n), \varepsilon_u) + \\ & \alpha_3 h(\overline{PL}_c(n), \varepsilon_p) + \alpha_4 h(\overline{T}_c(n), \varepsilon_t) > 0, \\ 0, & \text{otherwise} \end{cases}$$

if $H_c=1$, then the operating state of the cell is abnormal; wherein, $\alpha_1, \alpha_2, \alpha_3, \alpha_4$ are weighted factors, $$\sum_{j=1}^{4} \alpha_j = 1,$$

and $h(\overline{R}_c(n),\varepsilon_r)=(\overline{R}_c(n)-E^r)-\sqrt{Var^r/\varepsilon_r}$, $\overline{R}_c(n)$ is an arithmetic mean value of ($R_c[(n-1)W+1], \ldots, R_c[n]$), $E^r$ is an expectation of $R_c[n]$ determined according to the probability density distribution of the data rate of user traffic requirement, $Var^r$ is a variance of $R_c[n]$ determined according to the probability density distribution of the data rate of user traffic requirement, $\varepsilon_r$ is an upper limit of the false alarm probability when detecting the change of the data rate of user traffic requirement; $h(\overline{U}_c(n),\epsilon_u)=(\overline{U}_c(n)-E^u)-\sqrt{Var^u/\epsilon_u}$, $\overline{U}_c(n)$ is an arithmetic mean value of the $(U_c[(n-1)W+1], \ldots, U_c[n])$, $E^u$ is an expectation of $U_c[n]$ determined according to the probability density distribution of the number of users associated with the AP, $Var^u$ is a variance of $U_c[n]$ determined according to the probability density distribution of the number of users associated with the AP, $\epsilon_u$ is an upper limit of the false alarm probability when detecting the number change of users associated with the AP; $h(\overline{PL}_c(n),\epsilon_{pl})=(\overline{PL}_c(n)-E^{pl})-\sqrt{Var^{pl}/\epsilon_{pl}}$, $\overline{PL}_c(n)$ is an arithmetic mean value of the $(PL_c[(n-1)W+1], \ldots, PL_c[n])$, $E^{pl}$ is an expectation of $PL_c[n]$ determined according to the probability density distribution of the average length of data packets, $Var^{pl}$ is a variance of $PL_c[n]$ determined according to the probability density distribution of the average length of data packets, $\epsilon_{pl}$ is an upper limit of the false alarm probability when detecting the change of the average length of data packets; $h(\overline{T}_c(n),\epsilon_t)=(\overline{T}_c(n)-E^t)-\sqrt{Var^t/\epsilon_t}$, $\overline{T}_c(n)$ is an arithmetic mean value of the $(T_c[(n-1)W+1], \ldots, T_c[n])$, $E^t$ is an expectation of $T_c[n]$ determined according to the probability density distribution of the average duration of successful transmissions, $Var^t$ is a variance of $T_c[n]$ determined according to the probability density distribution of the average duration of successful transmissions, $\epsilon_t$ is an upper limit of the false alarm probability when detecting the change of the average duration of successful transmissions; the determining module 31 is specifically configured to determine an actual traffic rate of a guaranteed bit rate GBR user and an average rate of a non-guaranteed bit rate Non-GBR user; determine $S_{GBR,c}$ according to the actual traffic rate of the GBR user, and determine $S_{Non-GBR,c}$ according to the average rate of a Non-GBR user; where, $$S_{GBR,c} = \frac{\sum \text{actual resulting rate of each } GBR \text{ user}}{\sum \text{guaranteed rate of each } GBR \text{ user}},$$

$$S_{Non-GBR,c} = \frac{\text{average rate of Non-}GBR \text{ user}}{AMBR \text{ mean value of Non-}GBR \text{ user}};$$

determine $S_c$ according to the $S_{GBR,c}$ and $S_{Non-GBR,c}$, where $S_c=k_1 \cdot S_{GBR,c}+(1-k_1)S_{Non-GBR,c}$, $S_c$ is the satisfaction degree of user.

On the basis of the embodiment shown in FIG. 4, the device further includes: a predicting module 32, configured to predict a predicted satisfaction degree of user within a set future time period according the satisfaction degree of user; the determining module 31 is further configured to determine that a traffic hot spot exists in the cell within the set future time period, if the predicted satisfaction degree of user is lower than a second preset threshold; the predicting module 32 is configured to predict the predicted satisfaction degree of user within a set future time period according $$\begin{cases} L_n = \zeta \cdot (S_n - I_{n-d}) + (1-\zeta)L_{n-1} \\ I_n = \delta \cdot (S_n - L_n) + (1-\delta)I_{n-d} \\ \hat{S}_{n+h} = L_n + I_{n-d+h \bmod d} \end{cases},$$

where $\hat{S}_{n+h}$ is the predicted satisfaction degree of user, $S_n$ is the satisfaction degree of user, $L_n$ is a mean portion of the predicted satisfaction degree of user, $I_n$ is a periodic portion of the predicted satisfaction degree of user, d is the period that sequence $S_1, S_2, \ldots, S_n$ varies, $\zeta$ and $\delta$ are smoothing parameters for controlling the predicted satisfaction degree of user.

Furthermore, on the basis of the embodiment shown in FIG. 4, the device further includes a sending module 33, configured to send a traffic hot spot detection message to an access controller AC, so that the AC can determine a traffic hot spot area of a network according to the traffic hot spot detection message, the traffic hot spot detection message carries a traffic hot spot THS, and the THS is used for indicating that a traffic hot spot exists in the cell; the traffic hot spot detection message further includes: an identity ID of the AP, the number of users associated with the AP, the data rate of user traffic requirement, the average length of data packets, the average duration of successful transmissions, and the satisfaction degree of user or the predicted satisfaction degree of user; the traffic hot spot detection message is sent based on a wireless access point protocol CAPWAP message or a simple network management protocol SNMP message.

The device for detecting a traffic hot spot of a cell in this embodiment can perform the method for detecting a traffic hot spot of a cell shown in above embodiments, they have similar implementation principle and technical effect, and thus the details will not be described herein again.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present invention.

What is claimed is:

1. A method for detecting a traffic hot spot of a cell, comprising:
   acquiring load information of a cell in which a wireless access point (AP) is located, wherein the load information comprises at least two types of the following information: a data rate of user traffic requirement, the number of users associated with an AP, an average length of data packets and an average duration of successful transmissions, wherein the data rate of user traffic requirement comprises the data rate of traffic requirement of a guaranteed bit rate (GBR) user and the data rate of traffic requirement of a non-guaranteed bit rate (Non-GBR) user;
   determining whether an operating state of the AP is abnormal according to the at least two types of information;
   determining a satisfaction degree of user according to an actual traffic rate of user if the operating state of the AP is abnormal, wherein the satisfaction degree of user directly indicates the user satisfaction degree of the cell; and
   determining that the traffic hot spot exists in the cell if the satisfaction degree of user of the cell is lower than a first preset threshold;

wherein the acquiring the load information of the cell in which the wireless access point AP is located, comprises:

acquiring samples of W sub-periods of the data rate of user traffic requirement ($R_c[(n-1)W+1], \ldots, R_c[n]$) during a statistical period n, and determining a probability density distribution of the data rate of user traffic requirement according to the ($R_c[(n-1)W+1], \ldots, R_c[n]$);

acquiring samples of W sub-periods of the number of users associated with the AP ($U_c[(n-1)W+1], \ldots, U_c[n]$) during the statistical period n, and determining a probability density distribution of the number of users associated with the AP according to the ($U_c[(n-1)W+1], \ldots, U_c[n]$);

acquiring samples of W sub-periods of the average length of data packets ($PL_c[(n-1)W+1], \ldots, PL_c[n]$) during the statistical period n, and determining a probability density distribution of the average length of data packets according to the ($PL_c[(n-1)W+1], \ldots, PL_c[n]$); and acquiring samples of W sub-periods of the average duration of successful transmissions ($T_c[n-1)W+1], \ldots, T_c[n]$) during the statistical period n, and determining a probability density distribution of the average duration of successful transmissions according to the ($T_c[(n-1)W+1], \ldots, T_c[n]$).

2. The method according to claim 1, wherein the determining whether an operating state of the AP is abnormal according to the at least two types of information, comprises:

determining whether an operating state of the cell is abnormal according to $$H_c = \begin{cases} 1, & \text{if } \alpha_1 h(\overline{R}_c(n), \varepsilon_r) + \alpha_2 h(\overline{U}_c(n), \varepsilon_u) + \\ & \alpha_3 h(\overline{PL}_c(n), \varepsilon_p) + \alpha_4 h(\overline{T}_c(n), \varepsilon_t) > 0, \\ 0, & \text{otherwise} \end{cases}$$

if $H_c=1$, then the operating state of the cell is abnormal; wherein, $\alpha_1, \alpha_2, \alpha_3, \alpha_4$ are weighted factors, $$\sum_{j=1}^{4} \alpha_j = 1,$$

and $h(\overline{R}_c(n), \epsilon_r) = (\overline{R}_c(n) - E^r) - \sqrt{Var^r/\epsilon_r}$, $\overline{R}_c(n)$ is an arithmetic mean value of ($R_c[(n-1)W+1], \ldots, R_c[n]$), $E^r$ is an expectation of $R_c[n]$ determined according to the probability density distribution of the data rate of user traffic requirement, $Var^r$ is a variance of $R[n]$ determined according to the probability density distribution of the data rate of user traffic requirement, $\epsilon_r$ is an upper limit of a false alarm probability when detecting the change of the data rate of user traffic requirement;

$h(\overline{U}_c(n), \epsilon_u) = (\overline{U}_c(n) - E^u) - \sqrt{Var^u/\epsilon_u}$, $\overline{U}_c(n)$ is an arithmetic mean value of the ($U_c[(n-1)W+1], \ldots, U_c[n]$), $E^u$ is an expectation of $U_c[n]$ determined according to the probability density distribution of the number of users associated with the AP, $Var^u$ is a variance of $U_c[n]$ determined according to the probability density distribution of the number of users associated with the AP, $\epsilon_u$ is an upper limit of a false alarm probability when detecting the number change of users associated with the AP;

$h(\overline{PL}_c(n), \epsilon_{pl}) = (\overline{PL}_c(n) - E^{pl}) - \sqrt{Var^{pl}/\epsilon_{pl}}$, $\overline{PL}_c(n)$ is an arithmetic mean value of the ($PL_c[(n-1)W+1], \ldots, PL_c[n]$), $E^{pl}$ is an expectation of $PL_c[n]$ determined according to the probability density distribution of the average length of data packets, $Var^{pl}$ is a variance of $PL_c[n]$ determined according to the probability density distribution of the average length of data packets, $\epsilon_{pl}$ is an upper limit of a false alarm probability when detecting the change of the average length of data packets;

$h(\overline{T}_c(n), \epsilon_t) = (\overline{T}_c(n) - E^t) - \sqrt{Var^t/\epsilon_t}$, $\overline{T}_c(n)$ is an arithmetic mean value of the ($T_c[(n-1)W+1], \ldots, T_c[n]$), $E^t$ is an expectation of $T_c[n]$ determined according to the probability density distribution of the average duration of successful transmissions, $Var^t$ is a variance of $T_c[n]$ determined according to the probability density distribution of the average duration of successful transmissions, $\epsilon_t$ is an upper limit of a false alarm probability when detecting the change of the average duration of successful transmissions.

3. The method according to claim 1, wherein the determining the satisfaction degree of user according to the actual traffic rate of user, comprises:

determining an actual traffic rate of a GBR user and an average rate of a Non-GBR user;

determining $S_{GBR,c}$ according to the actual traffic rate of the GBR user, and determining $S_{Non-GBR,c}$ according to the average rate of a non-guaranteed bit rate Non-GBR user; wherein, $$S_{GBR,c} = \frac{\sum \text{actual resulting rate of each } GBR \text{ user}}{\sum \text{guaranteed rate of each } GBR \text{ user}},$$

$$S_{Non-GBR,c} = \frac{\text{average rate of Non-} GBR \text{ user}}{AMBR \text{ mean value of Non-} GBR \text{ user}};$$

determining $S_c$ according to the $S_{GBR,c}$ and $S_{Non-GBR,c}$, wherein $S_c = k_1 \cdot S_{GBR,c} + (1-k_1) S_{Non-GBR,c}$, $S_c$ is the satisfaction degree of user.

4. The method according to claim 1, wherein, after determining that the traffic hot spot exists in the cell, the method further comprises:

predicting a predicted satisfaction degree of user within a set future time period according the satisfaction degree of user;

determining that a traffic hot spot exists in the cell within the set future time period, if the predicted satisfaction degree of user is lower than a second preset threshold.

5. The method according to claim 4, wherein the predicting the predicted satisfaction degree of user within the set future time period according the satisfaction degree of user, comprises:

predicting the predicted satisfaction degree of user within a set future time period according $$\begin{cases} L_n = \zeta \cdot (S_n - I_{n-d}) + (1-\zeta) L_{n-1} \\ I_n = \delta \cdot (S_n - L_n) + (1-\delta) I_{n-d} \\ \hat{S}_{n+h} = L_n + I_{n-d+h \bmod d} \end{cases},$$

wherein $\hat{S}_{n+h}$ is the predicted satisfaction degree of user $S_n$ is the satisfaction degree of user, $L_n$ is a mean portion of the predicted satisfaction degree of user, $I_n$ is a periodic portion of the predicted satisfaction degree of user, d is the period that sequence $S_1, S_2, \ldots, S_n$ varies, $\zeta$ and $\delta$ are smoothing parameters for controlling the predicted satisfaction degree of user.

6. The method according to claim 4, wherein, after determining that the traffic hot spot exists in the cell, the method further comprises:
sending a traffic hot spot detection message to an access controller AC, so that the AC can determine a traffic hot spot area of a network according to the traffic hot spot detection message, wherein the traffic hot spot detection message carries a traffic hot spot THS, and the THS is used for indicating that a traffic hot spot exists in the cell.

7. The method according to claim 6, wherein the traffic hot spot detection message further comprises: an identity ID of the AP, the number of users associated with the AP, the data rate of user traffic requirement, the average length of data packets, the average duration of successful transmissions, and the satisfaction degree of user or the predicted satisfaction degree of user.

8. The method according to claim 7, wherein, the traffic hot spot detection message is sent based on a control and provisioning of wireless access point CAPWAP (Control and Provisioning of Wireless Access Points) message or a simple network management protocol SNMP message.

9. A device for detecting a traffic hot spot of a cell, comprising: a processor and a non-transitory computer-readable storage medium including computer-executable instructions stored therein, the processor, when executing the instructions, configured to:
acquire load information of a cell in which a wireless access point (AP) is located, wherein the load information comprises at least two types of the following information: a data rate of user traffic requirement, the number of users associated with an AP, an average length of data packets and an average duration of successful transmissions, wherein the data rate of user traffic requirement comprises the data rate of traffic requirement of a guaranteed bit rate (GBR) user and the data rate of traffic requirement of a non-guaranteed bit rate (Non-GBR) user;
determine whether an operating state of the AP is abnormal according to the at least two types of information; determine a satisfaction degree of user according to a data rate of user if the operating state of the AP is abnormal, wherein the satisfaction degree of user directly indicates the user satisfaction degree of the cell; and determine that the traffic hot spot exists in the cell if the satisfaction degree of user is lower than a first preset threshold;
wherein the processor is configured to:
acquire samples of W sub-periods of the data rate of user traffic requirement $(R_c[(n-1)W+1], \ldots, R_c[n])$ during a statistical period n, and determine a probability density distribution of the data rate of user traffic requirement according to the $(R_c[(n-1)W+1], \ldots, R_c[n])$;
acquire samples of W sub-periods of the number of users associated with the AP $(U_c[(n-1)W+1], \ldots, U_c[n])$ during the statistical period n, and determine a probability density distribution of the number of users associated with the AP according to the $(U_c[(n-1)W+1], \ldots, U_c[n])$;
acquire samples of W sub-periods of the average length of data packets $(PL_c[(n-1)W+1], \ldots, PL_c[n])$ during the statistical period n, and determine a probability density distribution of the average length of data packets according to the $(PL_c[(n-1)W+1], \ldots, PL_c[n])$; and
acquire samples of W sub-periods of the average duration of successful transmissions $(T_c[(n-1)W+1], \ldots, T_c[n])$ during the statistical period n, and determine a probability density distribution of the average duration of successful transmissions according to the $(T_c[(n-1)W+1], \ldots, T_c[n])$.

10. The device according to claim 9, wherein the processor is configured to determine whether an operating state of the cell is abnormal according to $$H_c = \begin{cases} 1, & \text{if } \alpha_1 h(\overline{R}_c(n), \varepsilon_r) + \alpha_2 h(\overline{U}_c(n), \varepsilon_u) + \\ & \alpha_3 h(\overline{PL}_c(n), \varepsilon_p) + \alpha_4 h(\overline{T}_c(n), \varepsilon_t) > 0, \\ 0, & \text{otherwise} \end{cases}$$

if $H_c=1$, then the operating state of the cell is abnormal; wherein, $\alpha_1, \alpha_2, \alpha_3, a_4$ are weighted factors, $$\sum_{j=1}^{4} \alpha_j = 1,$$

and $h(\overline{R}_c(n), \varepsilon_r) = (\overline{R}_c(n) - E^r) - \sqrt{Var^r/\varepsilon_r}$, $\overline{R}_c(n)$ is an arithmetic mean value of $(R_c[(n-1)W+1], \ldots, R_c[n])$, $E^r$ is an expectation of $R_c[n]$ determined according to the probability density distribution of the data rate of user traffic requirement, $Var^r$ is a variance of $R_c[n]$ determined according to the probability density distribution of the data rate of user traffic requirement, $\varepsilon_r$ is an upper limit of a false alarm probability when detecting the change of the data rate of user traffic requirement;

$h(\overline{U}_c(n), \varepsilon_u) = (\overline{U}_c(n) - E^u) - \sqrt{Var^u/\varepsilon_u}$, $\overline{U}_c(n)$ is an arithmetic mean value of the $(U_c[(n-1)W+1], \ldots, U_c[n])$, $E^u$ is an expectation of $U_c[n]$ determined according to the probability density distribution of the number of users associated with the AP, $Var^u$ is a variance of $U_c[n]$ determined according to the probability density distribution of the number of users associated with the AP, $\varepsilon_u$ is an upper limit of a false alarm probability when detecting the number change of users associated with the AP;

$h(\overline{PL}_c(n), \varepsilon_{pl}) = (\overline{PL}_c(n) - E^{pl}) - \sqrt{Var^{pl}/\varepsilon_{pl}}$, $\overline{PL}_c(n)$ is an arithmetic mean value of the $(PL_c[(n-1)W+1], \ldots, PL_c[n])$, $E^{pl}$ is an expectation of $PL_c[n]$ determined according to the probability density distribution of the average length of data packets, $Var^{pl}$ is a variance of $PL_c[n]$ determined according to the probability density distribution of the average length of data packets, $\varepsilon_{pl}$ is an upper limit of a false alarm probability when detecting the change of the average length of data packets;

$h(\overline{T}_c(n), \varepsilon_t) = (\overline{T}_c(n) - E^t) - \sqrt{Var^t/\varepsilon_t}$, $\overline{T}_c(n)$ is an arithmetic mean value of the $(T_c[(n-1)W+1], \ldots, T_c[n])$, $E^t$ is an expectation of $T_c[n]$ determined according to the probability density distribution of the average duration of successful transmissions, $Var^t$ is a variance of $T_c[n]$ determined according to the probability density distribution of the average duration of successful transmissions, $\epsilon_t$ is an upper limit of a false alarm probability when detecting the change of the average duration of successful transmissions.

11. The device according to claim 9, wherein the processor is configured to determine an actual traffic rate of a guaranteed bit rate GBR user and an average rate of a non-guaranteed bit rate Non-GBR user; determine $S_{GBR,c}$ according to the actual traffic rate of the GBR user, and determine $S_{Non-GBR,c}$ according to the average rate of a non-guaranteed bit rate Non-GBR user; wherein, $$S_{GBR,c} = \frac{\sum \text{actual resulting rate of each } GBR \text{ user}}{\sum \text{guaranteed rate of each } GBR \text{ user}},$$

$$S_{Non-GBR,c} = \frac{\text{average rate of Non-}GBR \text{ user}}{AMBR \text{ mean value of Non-}GBR \text{ user}};$$

determine $S_c$ according to the $S_{GBR,c}$ and $S_{Non-GBR,c}$, wherein $S_c = k_1 \cdot S_{GBR,c} + (1-k_1) S_{Non-GBR,c}$, $S_c$ is the satisfaction degree of user.

12. The device according to claim 9, wherein the processor is further configured to:

predict a predicted satisfaction degree of user within a set future time period according the satisfaction degree of user;

determine that a traffic hot spot exists in the cell within the set future time period, if the predicted satisfaction degree of user is lower than a second preset threshold.

13. The device according to claim 12, wherein the processor is configured to predict the predicted satisfaction degree of user within a set future time period according $$\begin{cases} L_n = \zeta \cdot (S_n - I_{n-d}) + (1-\zeta)L_{n-1} \\ I_n = \delta \cdot (S_n - L_n) + (1-\delta)I_{n-d} \\ \hat{S}_{n+h} = L_n + I_{n-d+h \bmod d} \end{cases},$$

wherein $\hat{S}_{n+h}$ is the predicted satisfaction degree of user, $S_n$ is the satisfaction degree of user, $L_n$ is a mean portion of the predicted satisfaction degree of user, $I_n$ is a periodic portion of the predicted satisfaction degree of user, d is the period that sequence $S_1, S_2, \ldots, S_n$ n varies, $\zeta$ and $\delta$ are smoothing parameters for controlling the predicted satisfaction degree of user.

14. The device according to claim 12, wherein the processor is further configured to:

send a traffic hot spot detection message to an access controller AC, so that the AC can determine a traffic hot spot area of a network according to the traffic hot spot detection message, wherein the traffic hot spot detection message carries a traffic hot spot THS, and the THS is used for indicating that a traffic hot spot exists in the cell.

15. The device according to claim 14, wherein the traffic hot spot detection message further comprises: an identity ID of the AP, the number of users associated with the AP, the data rate of user traffic requirement, the average length of data packets, the average duration of successful transmissions, and the satisfaction degree of user or the predicted satisfaction degree of user.

16. The device according to claim 15, wherein, the traffic hot spot detection message is sent based on a control and provisioning of wireless access point protocol CAPWAP message or a simple network management protocol SNMP message.

\* \* \* \* \*